(12) United States Patent
Hulse

(10) Patent No.: US 6,260,991 B1
(45) Date of Patent: Jul. 17, 2001

(54) COMPACT ILLUMINATOR FOR DISTRIBUTED LIGHTING SYSTEM

(75) Inventor: George R. Hulse, Cookeville, TN (US)

(73) Assignee: Cooper Automotive Products, Inc., Houston, TX (US)

( * ) Notice: Subject to any disclaimer, the term of this patent is extended or adjusted under 35 U.S.C. 154(b) by 0 days.

(21) Appl. No.: 09/140,281

(22) Filed: Aug. 26, 1998

Related U.S. Application Data

(63) Continuation of application No. 09/009,836, filed on Jan. 20, 1998.
(60) Provisional application No. 60/069,118, filed on Dec. 9, 1997.

(51) Int. Cl.⁷ .................................................... F21V 9/00
(52) U.S. Cl. ........................ 362/511; 362/300; 362/304; 362/310; 362/560
(58) Field of Search ................................ 362/560, 554, 362/556, 551, 511, 296–298, 304, 310, 341, 346, 347, 362, 20, 300, 242, 243, 247

(56) References Cited

U.S. PATENT DOCUMENTS

| 1,131,652 | * | 3/1915 | Anklam ................................. 362/247 |
| 1,276,766 | * | 8/1918 | Howe ...................................... 362/20 |
| 2,883,796 | * | 4/1959 | Reveka .................................. 446/219 |
| 3,962,702 | | 6/1976 | Kriege ............................. 340/815.43 |
| 4,222,091 | | 9/1980 | Bartenbach ......................... 362/565 |
| 4,428,029 | | 1/1984 | Baliozian ............................... 362/12 |
| 4,642,737 | * | 2/1987 | Meyers, Jr. .......................... 362/511 |
| 4,755,918 | | 7/1988 | Pristash et al. ..................... 362/301 |
| 4,883,333 | | 11/1989 | Yanez .................................... 385/33 |
| 4,897,771 | | 1/1990 | Parker ................................. 362/298 |
| 5,178,446 | * | 1/1993 | Gruber et al. ......................... 362/20 |
| 5,341,445 | | 8/1994 | Davenport et al. .................... 385/39 |
| 5,343,367 | | 8/1994 | Davenport et al. ................. 362/558 |
| 5,410,454 | | 4/1995 | Murase et al. ......................... 362/31 |
| 5,416,669 | * | 5/1995 | Kato et al. ............................. 362/32 |
| 5,436,805 | | 7/1995 | Hsu et al. ............................ 362/559 |
| 5,436,806 | | 7/1995 | Kato .................................... 362/511 |

(List continued on next page.)

OTHER PUBLICATIONS

Hulse et al., "Analysis of Waveguide Geometries at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, February.

Primary Examiner—Thomas M. Sember
Assistant Examiner—Ismael Negron
(74) Attorney, Agent, or Firm—Reising, Ethington, Barnes, Kisselle, Learman & McCulloch, P.C.

(57) ABSTRACT

A compact illuminator includes a housing having open ends configured to receive waveguides. A reflector is positioned within the housing. The reflector has open end portions, a central portion between the end portions, and a light source positioned within the central portion. Side walls extend between the end portions and at least partially enclose the central portion. The side walls protrude inward toward the light source. The reflector is shorter in length than the housing so that the waveguides fit within the housing and abut the end portions of the reflector.

19 Claims, 21 Drawing Sheets

U.S. PATENT DOCUMENTS

| | | | |
|---|---|---|---|
| 5,499,168 | 3/1996 | Cochard et al. | 362/466 |
| 5,521,797 | 5/1996 | Kashima et al. | 362/31 |
| 5,526,237 * | 6/1996 | Davenport et al. | 362/551 |
| 5,559,911 * | 9/1996 | Forkner et al. | 385/33 |
| 5,560,699 | 10/1996 | Davenport et al. | 362/588 |
| 5,574,328 | 11/1996 | Okuchi | 315/114 |
| 5,675,677 | 10/1997 | Davenport et al. | 385/31 |
| 5,755,505 | 5/1998 | Hiramatsu | 362/581 |
| 5,791,756 | 8/1998 | Hulse et al. | 362/544 |
| 5,812,714 | 9/1998 | Hulse | 385/39 |

* cited by examiner

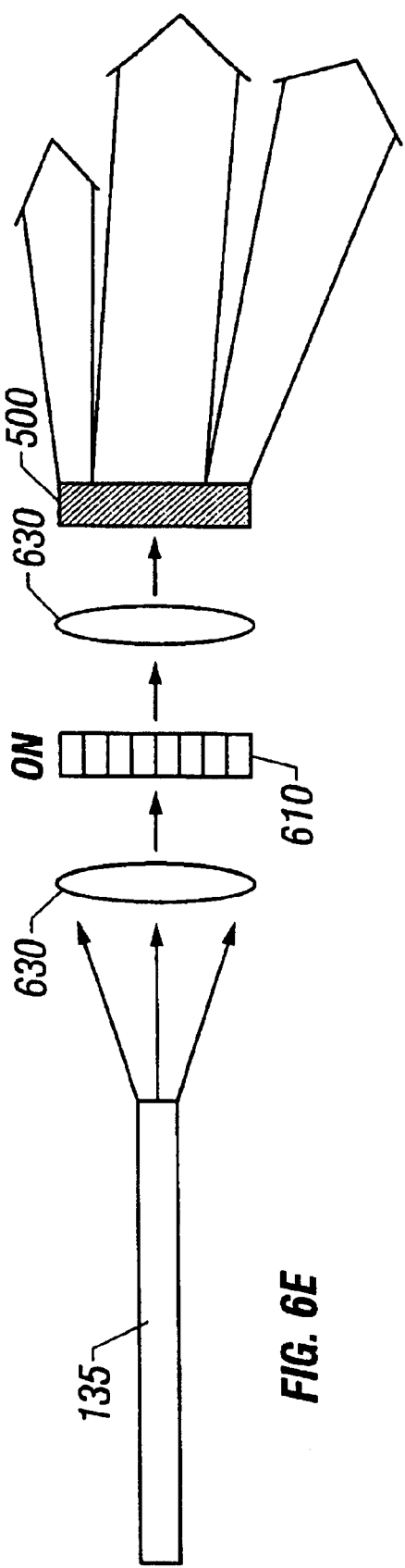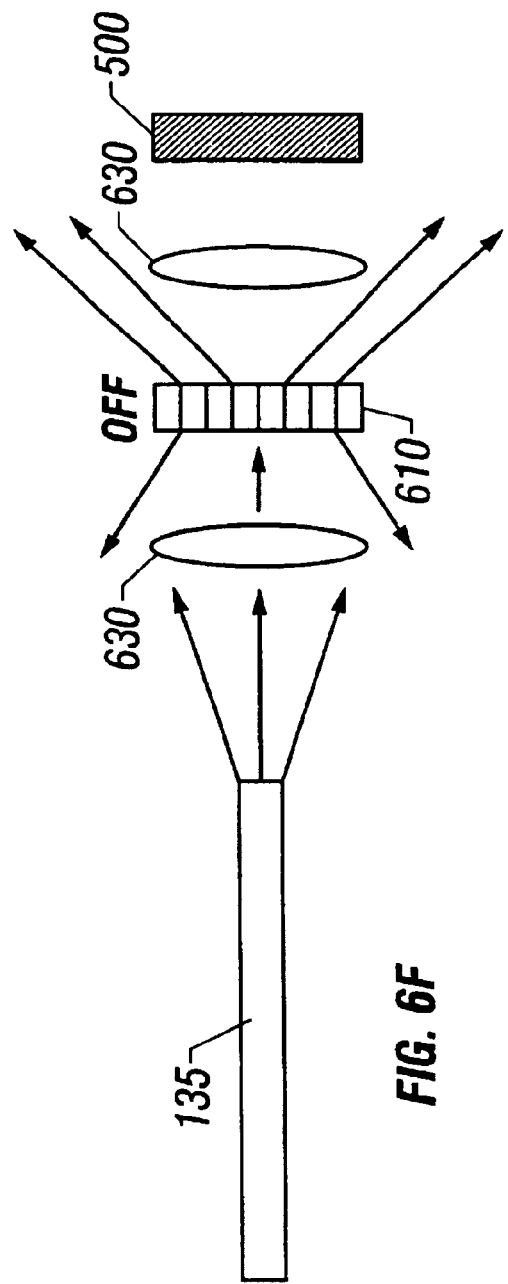
FIG. 6E
FIG. 6F

COMPACT ILLUMINATOR FOR DISTRIBUTED LIGHTING SYSTEM

CROSS REFERENCE TO RELATED APPLICATIONS

This application claims priority from Provisional Application No. 60/069,118, "HID DRIVEN FOCUS-LESS OPTICS SYSTEM," filed Dec. 9, 1997 and a con't of application Ser. No. 09/009,836, "DISTRIBUTED LIGHTING SYSTEM," filed Jan. 20, 1998, both of which are incorporated by reference.

BACKGROUND

The invention relates to distributed lighting systems.

Distributed lighting systems distribute light from one or more light sources in central or strategic locations to one or more remote locations. A distributed lighting system promises several advantages over conventional lighting techniques, including low power consumption, extended life, heat reduction where the light is emitted, and increased design flexibility.

SUMMARY

In one aspect, generally, a compact illuminator includes a housing having open ends configured to receive waveguides. A reflector is positioned within the housing. The reflector has open end portions, a central portion between the end portions, and a light source positioned within the central portion. Side walls extend between the end portions and at least partially enclose the central portion. The side walls protrude inward toward the light source. The reflector is shorter in length than the housing so that the waveguides fit within the housing and abut the end portions of the reflector.

Embodiments may include one or more of the following features. A length of the end portions may serve to confine light output by the illuminator within the waveguides by internal reflection. An angle formed by the side walls may serve to confine light output by the illuminator within the waveguides by internal reflection. The housing and/or the side walls may have vent holes.

The compact illuminator may include a second reflector having open end portions, a central portion between the end portions and a light source positioned within the central portion. Side walls may extend between the end portions and at least partially enclose the central portion. The side walls may protrude inward toward the light source. An optical waveguide may be positioned between the output of the first illuminator and an input of the second illuminator.

In another aspect, a hybrid compact illuminator includes a housing having reflective interior surfaces. A lens is positioned on a first side of the housing. A primary light source is positioned within the housing to provide a direct lighting function through the lens. An optical waveguide output port holds an optical waveguide in position to receive light from the primary light source. A secondary light source is positioned within a compartment formed in a second side of the housing.

Embodiments may include one or more of the following features. The compartment may protrude from the housing or extend into the housing. The sides of the hybrid compact illuminator may have vent holes.

In another aspect, a redundant distributed lighting system has first and second illuminators. Each illuminator includes open end portions, a central portion between the end portions and a light source positioned within the central portion. Side walls extend between the end portions and at least partially enclose the central portion. The side walls protrude inward toward the light source. The system also includes an optical waveguide positioned between the output of the first illuminator and an input of the second illuminator.

The invention provides a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich., Feb. 26–29, 1996 and Hulse and Mullican in "Analysis of Waveguide Geometries at Bends and Branches for the Directing of Light," SAE Technical Paper Series, Paper No. 981189, which are incorporated herein by reference.

Other features and advantages will be apparent from the following detailed description, including the drawings, and from the claims.

BRIEF DESCRIPTION OF THE DRAWINGS

FIGS. 6A–6F show waveguide outputs modulated with electromechanical or liquid crystal light valves.

DESCRIPTION

Figure 1:
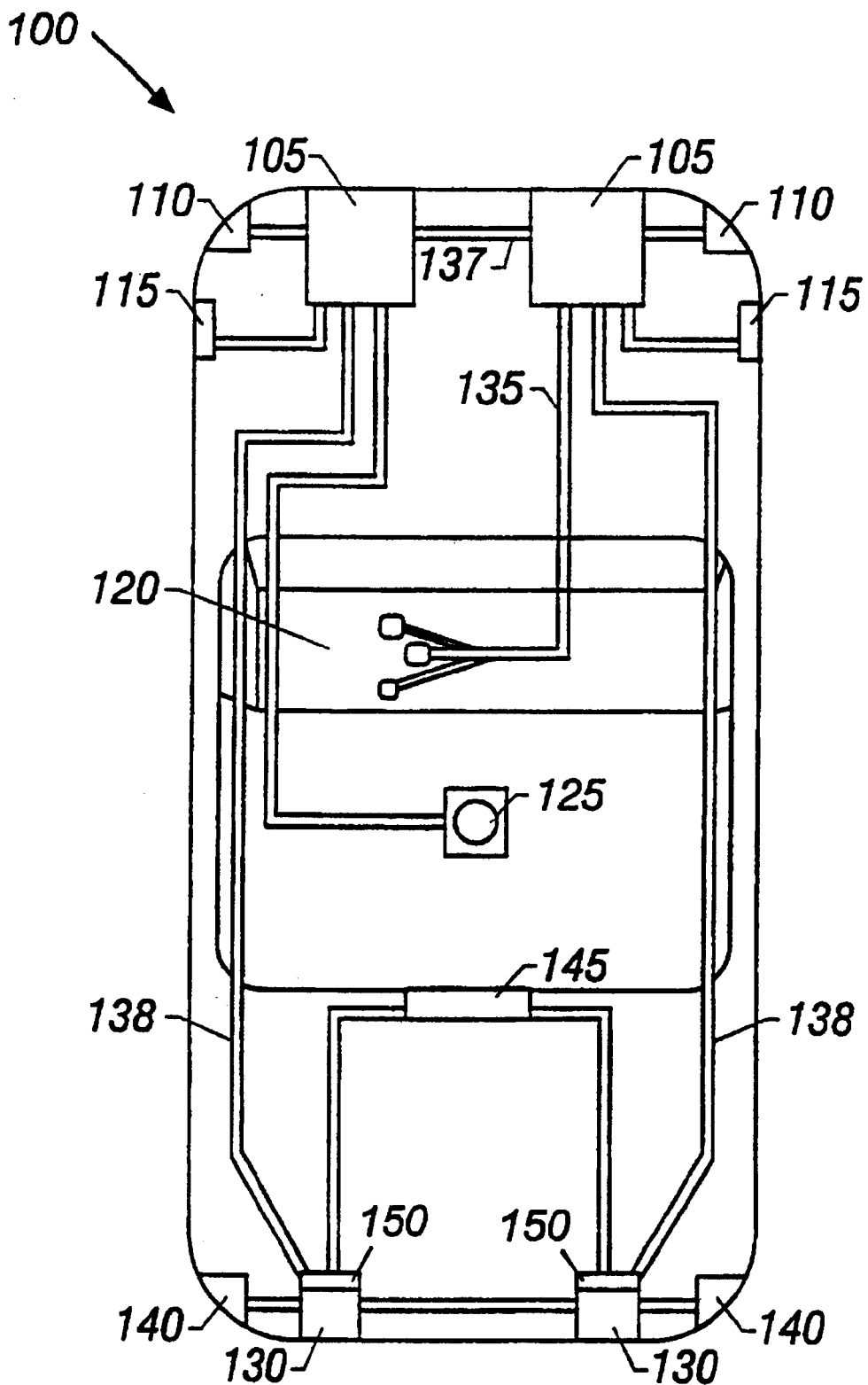
FIG. 1 is a block diagram of a vehicle distributed lighting system with hybrid lighting subsystems.

Referring to FIG. 1, a vehicle distributed lighting system (DLS) 100 includes hybrid headlamp subsystems 105, turn signal subsystems 110 and 140, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135 or optical fibers. Similarly, the tail light subsystems 130 provide light for the turn signal subsystem 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, assist grips, and storage pockets.

Figure 2:
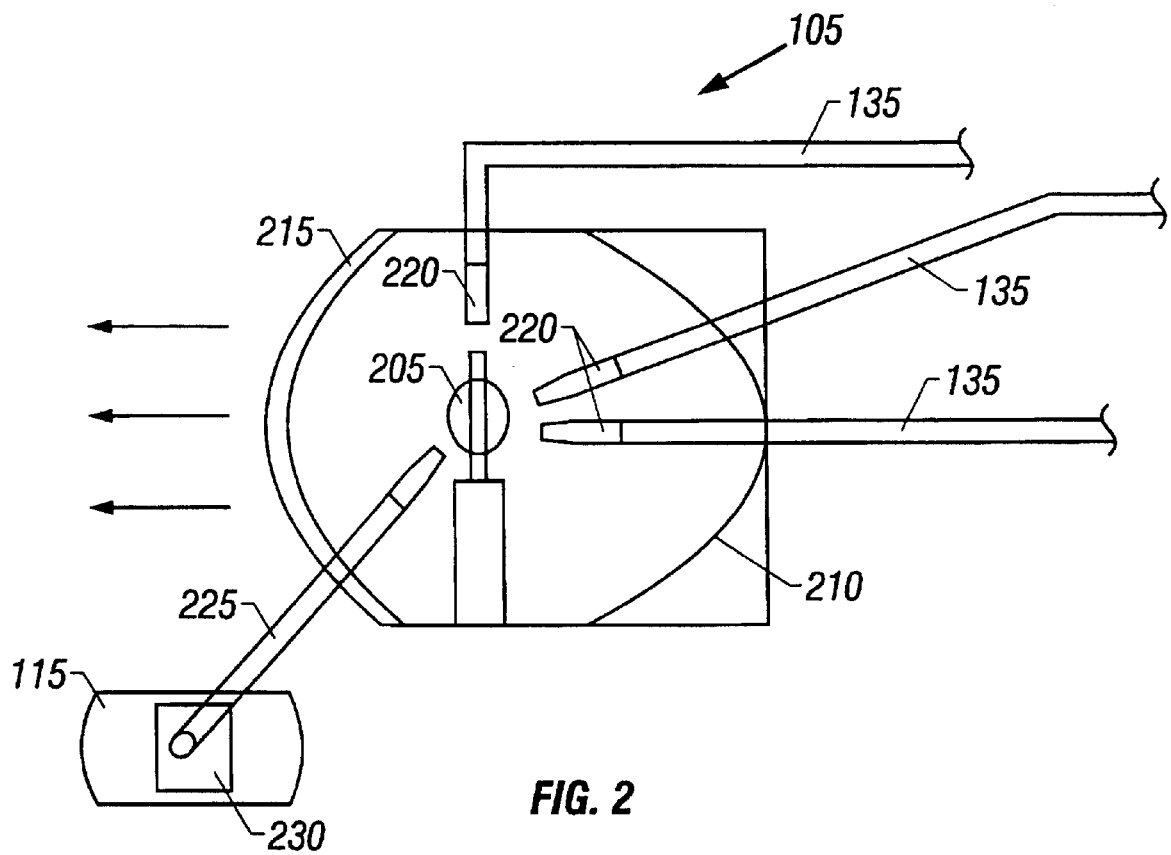
FIG. 2 shows a hybrid headlamp subsystem.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

Figure 3:
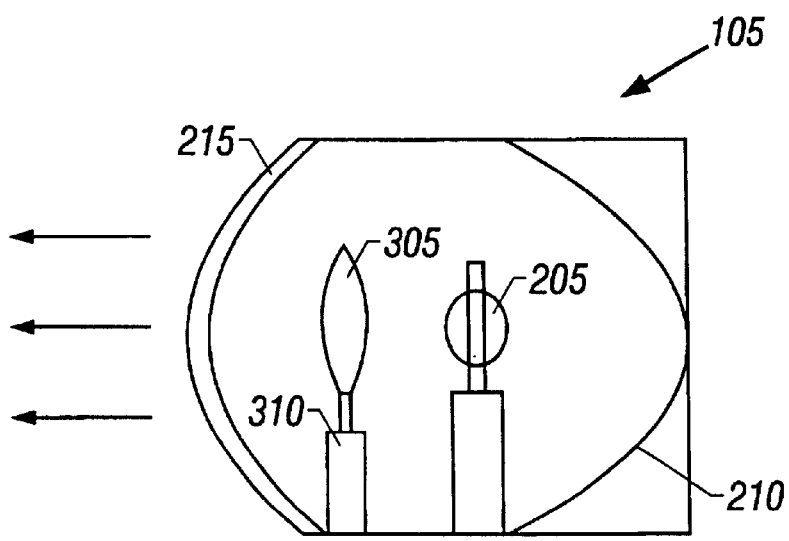
FIG. 3 shows a hybrid headlamp subsystem with a movable lens.
Figure 4A:
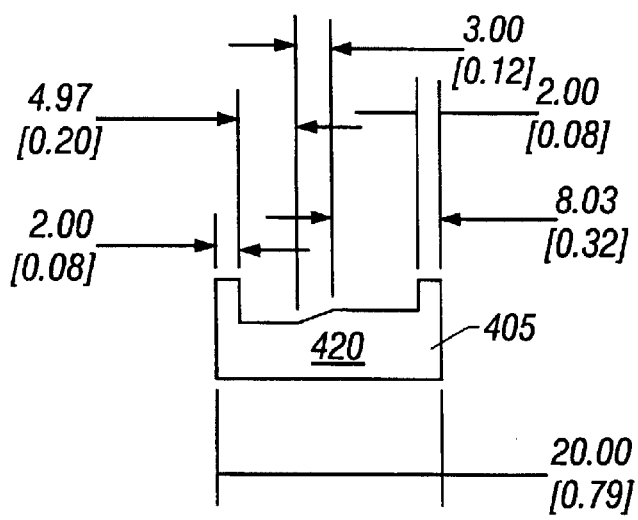
FIGS. 4A–4G show headlamp beam forming structures.
Figure 4B:
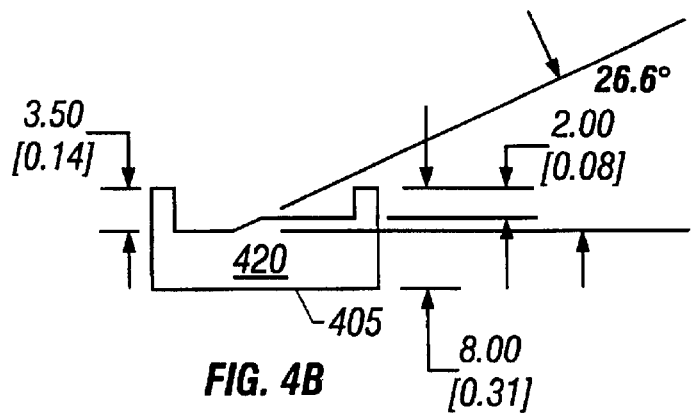
Figure 4C:
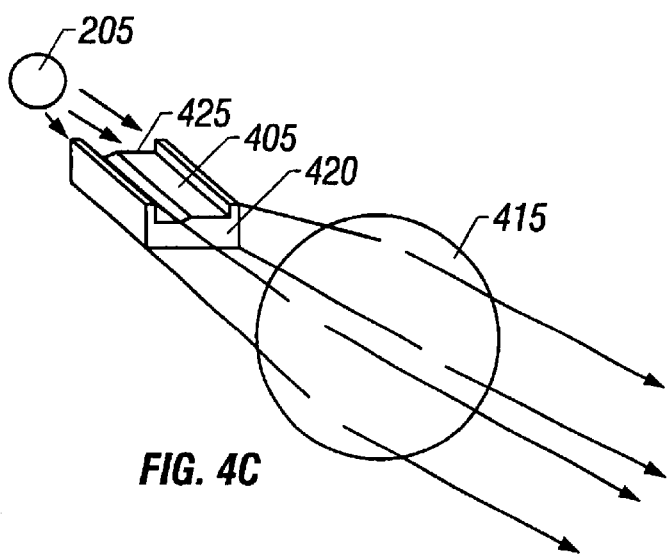
Figure 4D:
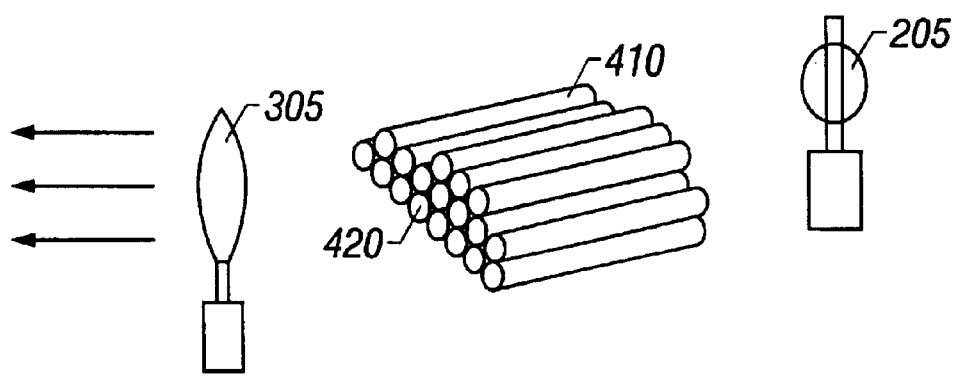

The hybrid headlamp subsystem 105 provides both high beam and low beam illumination. To this end, the subsystem may employ a number of different beam forming techniques, as shown in FIGS. 3–5. For example, FIG. 3 shows a simple Fresnel lens 305 that is moved by an actuator 310 between a high beam position and a low beam position. The movement of the lens 305 shifts the position of the "hot spot" (i.e., the area of most concentrated light) of the headlamp beam in the far field between the appropriate positions for the high and low beams. Other portions of the beam also will shift as the lens 305 moves. In addition to the lens 305 shown, additional lenses or other optical elements (such as wedges) may be used to control the beam pattern.

FIGS. 4A–4G show the use of beamforming structures, such as a solid molded form 405 (FIGS. 4A–4C), a bundle of plastic or glass fibers 410 (FIG. 4D), or a solid molded wedge 431 (FIG. 4F), 440 (FIG. 4G), to generate a desired headlamp beam pattern. As shown in FIGS. 4A–4D, light from a light source 205 passes through a form 405 or bundle 410 and then passes through a focusing lens 415. The shape of the output end 420 of the solid form 405 or bundle 410, in conjunction with the properties of the focusing lens 415, determines the beam pattern in the far field.

To increase light collection efficiency, the shape of the input face 425 of the solid form may be configured to act as a collector element to receive light from a light source. A reflector 210, similar to that shown in FIGS. 2 and 3 may focus light from the light source and direct the light toward the input of the beamforming structure.

Figure 4E:
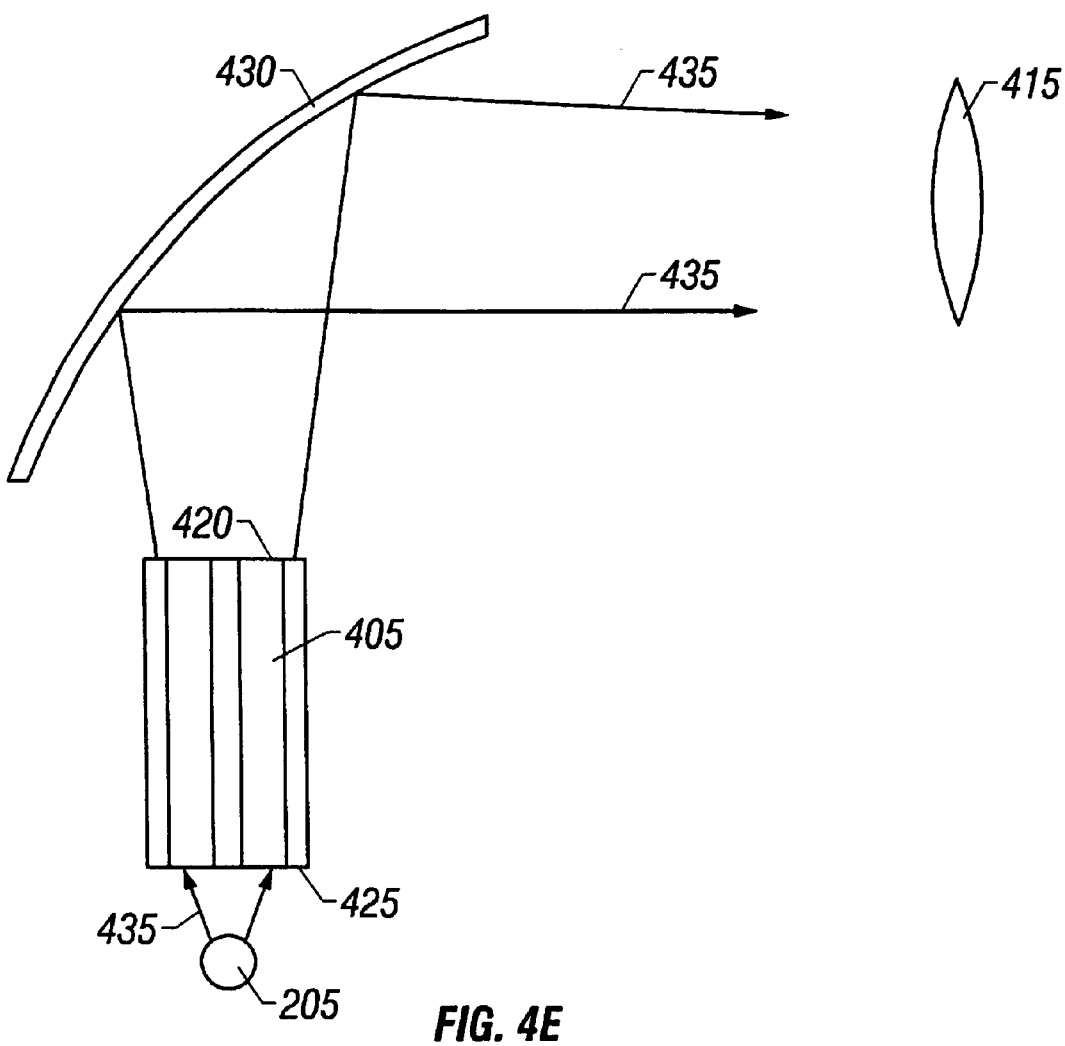
Figure 5:
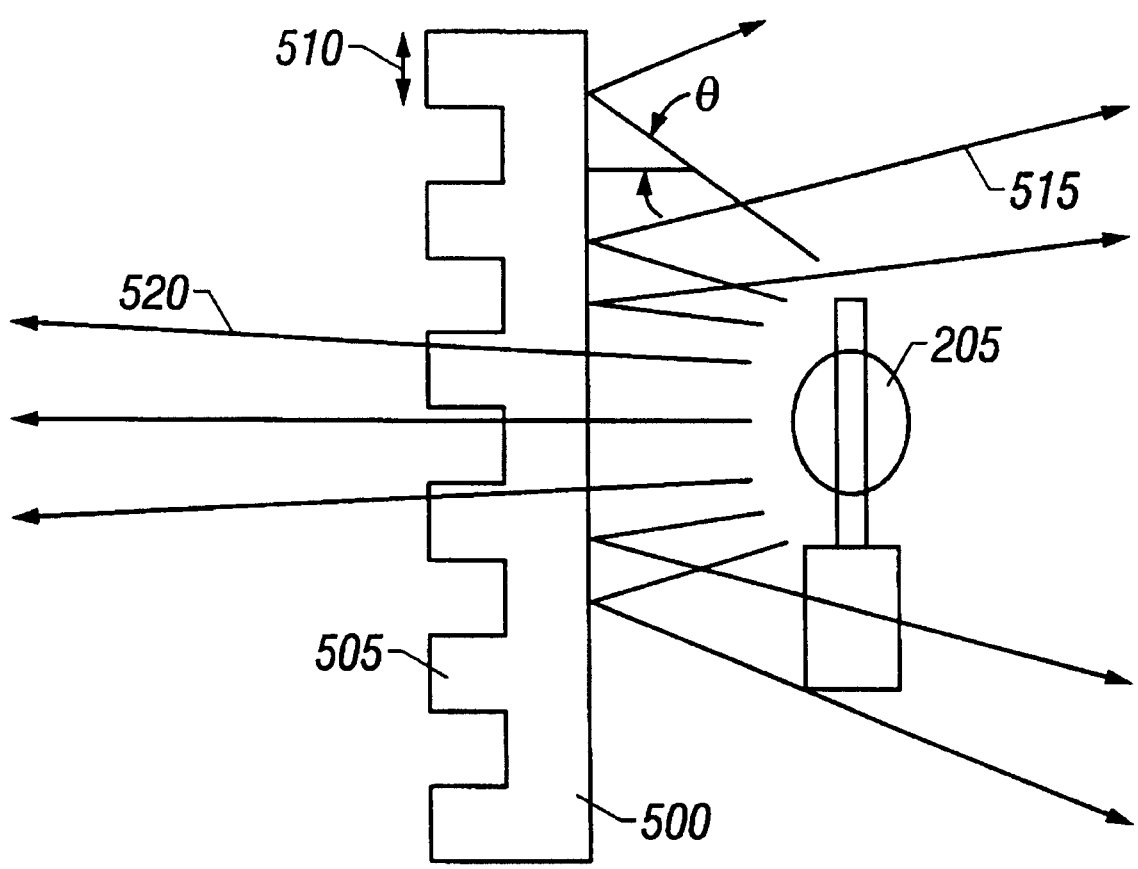
FIG. 5 shows a light source with a diffusion grating.

Alternatively, as shown in FIG. 4E, the beamforming structure may be positioned between the light source and a reflector 430. In such a configuration, light 435 from the light source 205 enters the input face 425 of the solid form 405 (a fiber bundle 410 may also be used), passes through the form 405 and is transmitted from the output face 420. The light 435 then is reflected from the reflector 430 and output by the headlamp. A lens 415 may be positioned at the output, as shown in FIG. 4E, or between the form 405 and the reflector 430.

FIGS. 4A–4C show dimensions in mm [inches] of a thickness profile of a beamforming structure that might be used to achieve a desired beam pattern. Similarly, the bundle of fibers can be formed into a desired profile. The input or output ends of the fibers may be fused together. As with the implementation shown in FIG. 3, the lens 305 may be moved to shift the hot spot of the beam between high beam and low beam positions. The solid molded form 405 may be inexpensively manufactured using injection molding techniques. The form 405 may be replaced in order to implement alternative beam patterns or to meet differing specifications or regulations.

Figure 4F:
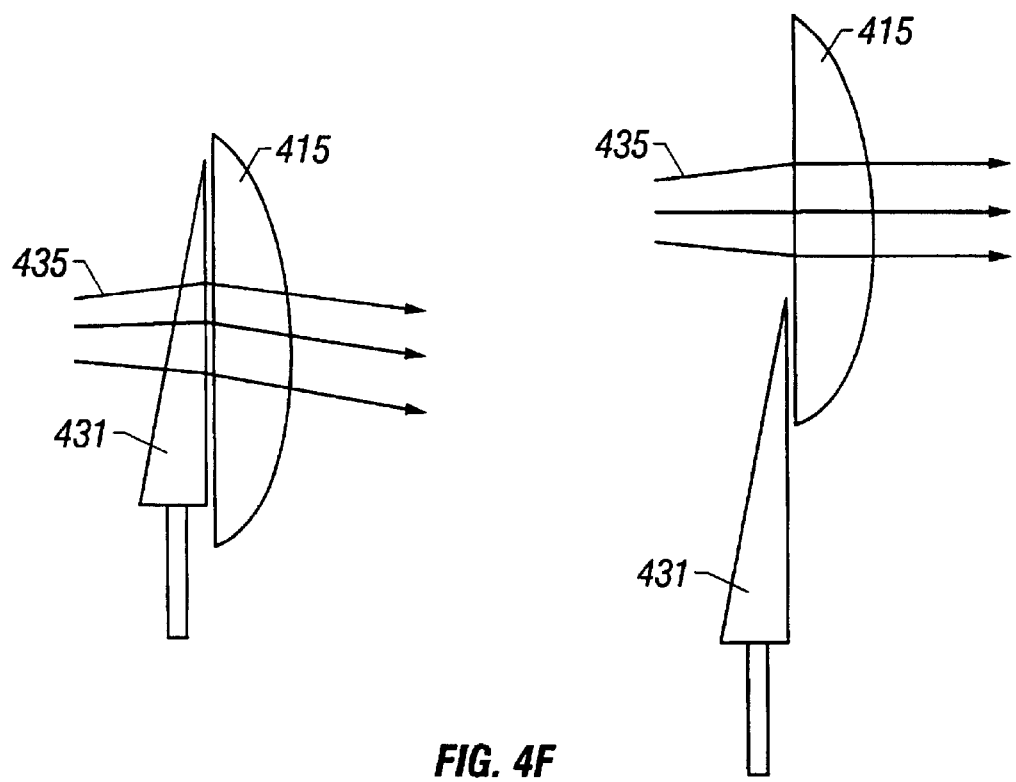

FIG. 4F shows a simple solid wedge 431 positioned on the side of a lens 415 facing the light source. Light 435 from the light source passes through the wedge 431 and is directed downward to provide a headlamp low beam. The wedge 431 is moved away from the lens 415 to allow the light 435 to pass directly through the lens 415 to provide a headlamp high beam.

Figure 4G:
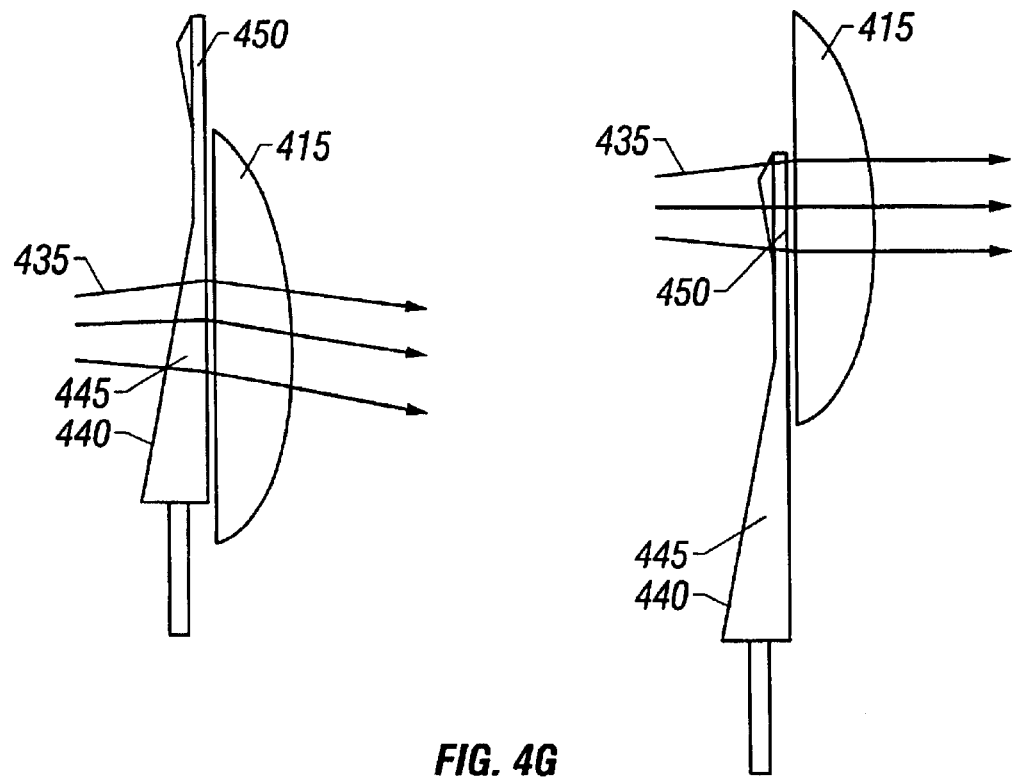

Similarly, FIG. 4G shows a complex wedge 440 having a low beam portion 445 and a high beam portion 450. The wedge 440 is positioned on the side of the lens facing the light source. Light 435 from the light source passes through the low beam portion 445 of the wedge 440 and is directed downward to form a headlamp low beam. The wedge 440 is moved downward so that the high beam portion 450 of the wedge 440 is positioned between the light source and the lens. The high beam portion 450 may vary in thickness across its surface in order to produce a desired beam pattern. In addition, the position of the wedge 440 may be continually adjusted during driving to maintain the direction of the forward illumination relative to the road surface. The wedge may also have additional portions that produce other lighting patterns, such as peripheral or fog lighting.

FIG. 5 shows the use of a diffraction grating 500 to control the headlamp beam pattern (the diffraction grating may also be used for other lighting functions, such as stop lights and turn signals). The diffraction grating 500 includes essentially transparent material that has a series of ridges 505 on its surface. The width 510 of the ridges is approximately equal to the wavelength of the light produced by the light source 205. A portion 515 of the light passing through the diffraction grating 500 is reflected back toward the light source, with the size of the portion depending upon the exit angle ($\theta$) of the light ray. Some of the light 520 travelling in a direction close to perpendicular ($\theta=0°$) passes through the grating undisturbed. By limiting the exit angle ($\theta$) of the headlamp illumination, the grating 500 may provide, for example, a more focused headlamp beam in the far field. The grating 500 may be used alone or in conjunction with lenses 305, solid forms 405 or fiber bundles 410 described above to provide a desired headlamp beam pattern.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2 shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

As shown in FIGS. 6A–6D, some implementations of the turn signal subsystem use an electromechanical modulator 605 (FIGS. 6A and 6B) while others use a liquid crystal light valve (LCLV) 610 (FIGS. 6C and 6D) to modulate the light produced by the turn signal. A plastic colored filter provides amber color for the turn signal. The use of a colored filter eliminates the need for light bulbs enclosed in cadmium-doped glass.

Figure 6A:
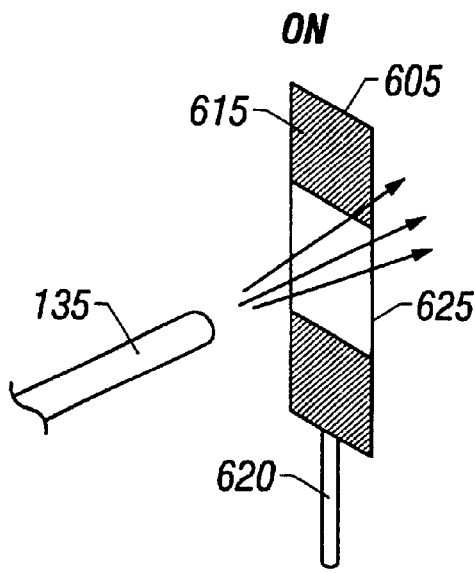
Figure 6B:
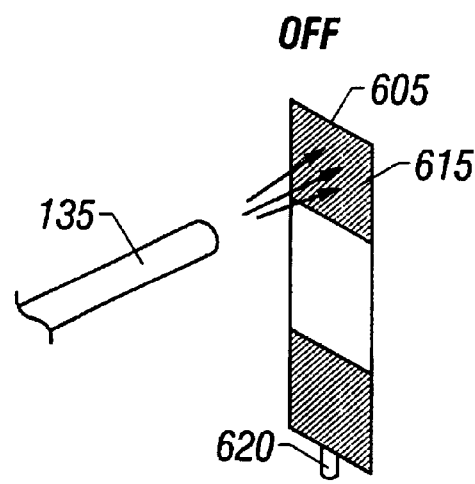

The electromechanical modulator 605, as shown in FIGS. 6A and 6B, includes an opaque shutter 615 that is moved between an ON (FIG. 6A) and OFF (FIG. 6B) position by a solenoid 620. In the ON position, the shutter 615 is moved away from the illumination path, so that essentially all of the light is transmitted. In the OFF position, the shutter 615 blocks the illumination path so that no light is transmitted. The use of an electromechanical modulator 605 with an amber-colored plastic filter provides a desirable aesthetic effect (i.e., the turn signal appears amber when ON but has no color when OFF).

Figure 6C:
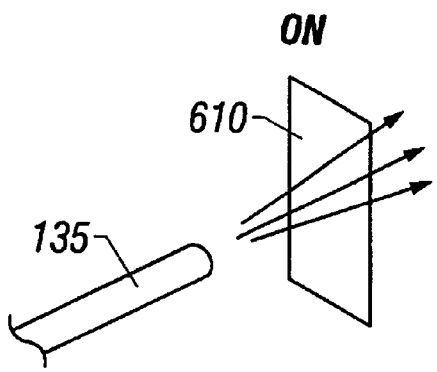
Figure 6D:
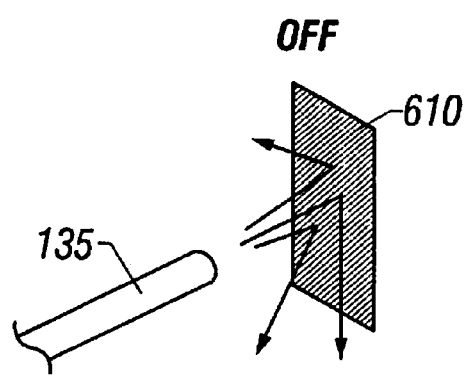

The LCLV 610 illustrated in FIGS. 6C and 6D has no mechanical components. This increases the reliability of the LCLV relating to systems that include mechanical components. The LCLV 610 has two states. In the OFF state (FIG. 6D) the LCLV 610 reflects or scatters most of the incident light. Alternatively, the LCLV 610 may absorb most of the incident light. In the ON state (FIG. 6C) the LCLV 610 becomes largely transparent (i.e., greater than 80% of incident light passes through the LCLV). The ratio of the light transmitted in the ON state relative to the light transmitted in the OFF state (i.e., the contrast ratio) is approximately 5:1, which meets SAE requirements for a turn signal. A contrast ratio of 5:1 also meets the SAE requirements for stop lights used as turn signals. An infrared reflecting mirror (not shown) may be used to shield a the LCLV from infrared energy from the source, thereby increasing the expected life of the LCLV.

As shown in FIGS. 6E and 6F, LCLV modulators 610 may be combined with diffraction gratings 500 to improve the contrast ratio and achieve a desired beam pattern. As discussed above, light from the light source (waveguide 135) is scattered when the LCLV is OFF (FIG. 6F). The diffraction grating 500 lessens the amount of forward scattered light that is emitted. Focusing optics, such as lenses 630, may also be used to provide further beam pattern control.

Referring again to FIG. 1, waveguides or optical fibers also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent printed circuit (PC) bulb may be used as a source for trunk lighting and may be connected to provide redundancy to interior reading lights.

Figure 7:
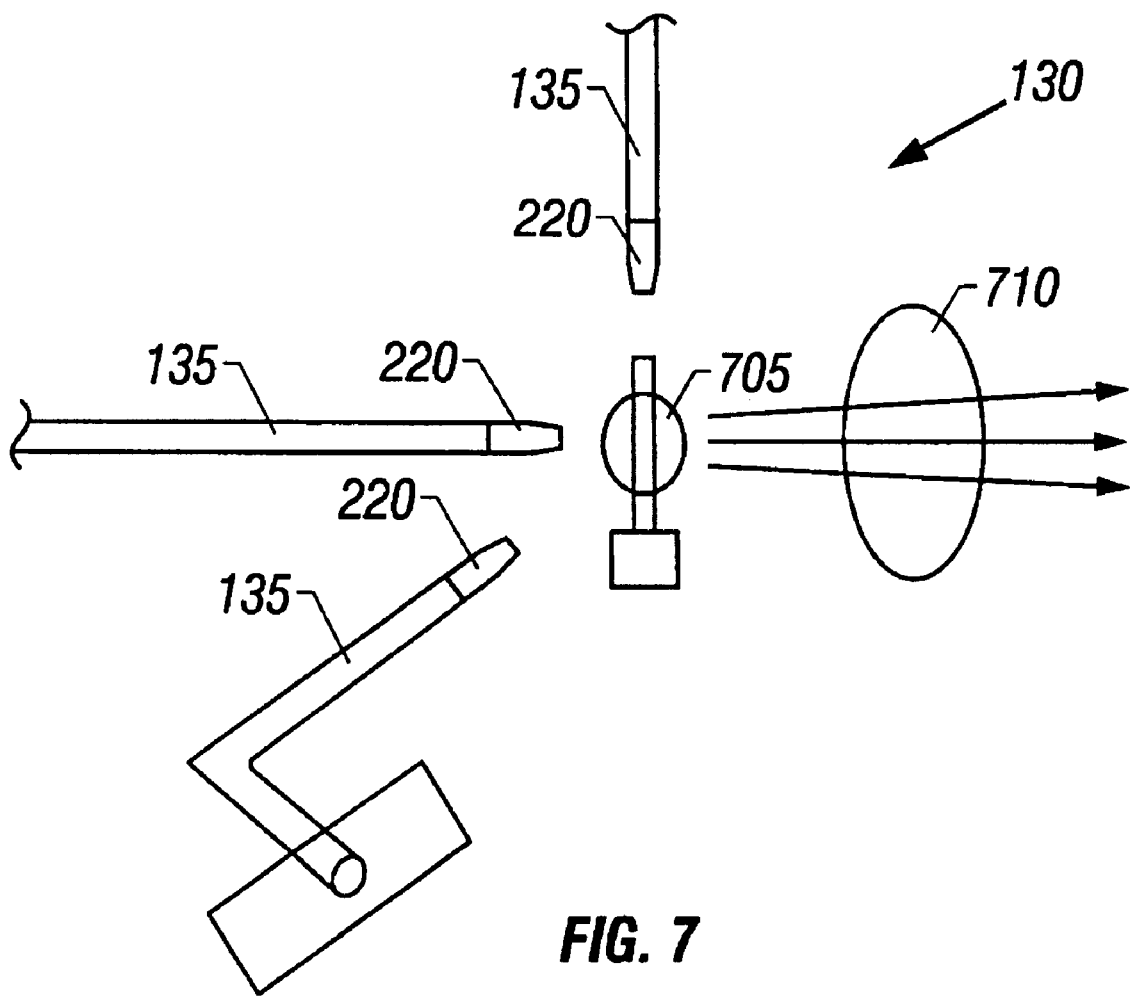
FIG. 7 shows a hybrid tail light subsystem.

The tail light subsystems 130 of FIG. 1 operate similarly to the headlamp subsystems. As shown in FIG. 7, a tail light subsystem 130 has a light source 705 that provides primary rear illumination through a lens 710. The light source 705 may be a HID lamp or another type of lighting source, such as an incandescent lamp, since the lighting requirement (in lumens) generally is less than the requirement for a headlamp. In general, an incandescent source is significantly less expensive than an HID source.

Figure 8A:
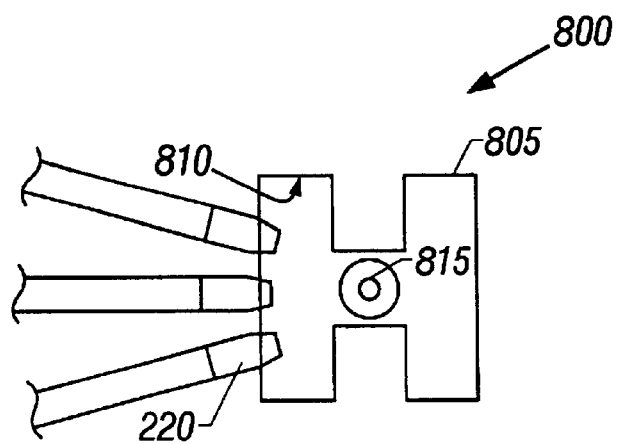
FIGS. 8A–8E shows compact illuminators.

A compact illuminator 800, such as shown in FIG. 8A, may be employed as the light source 705. The illuminator 800 includes a reflector 805 having reflective, heat-dissipating interior surfaces 810. A light source 815 is positioned in the center of the reflector 805. Waveguide collector elements 220 are positioned around the light source.

Figure 8B:
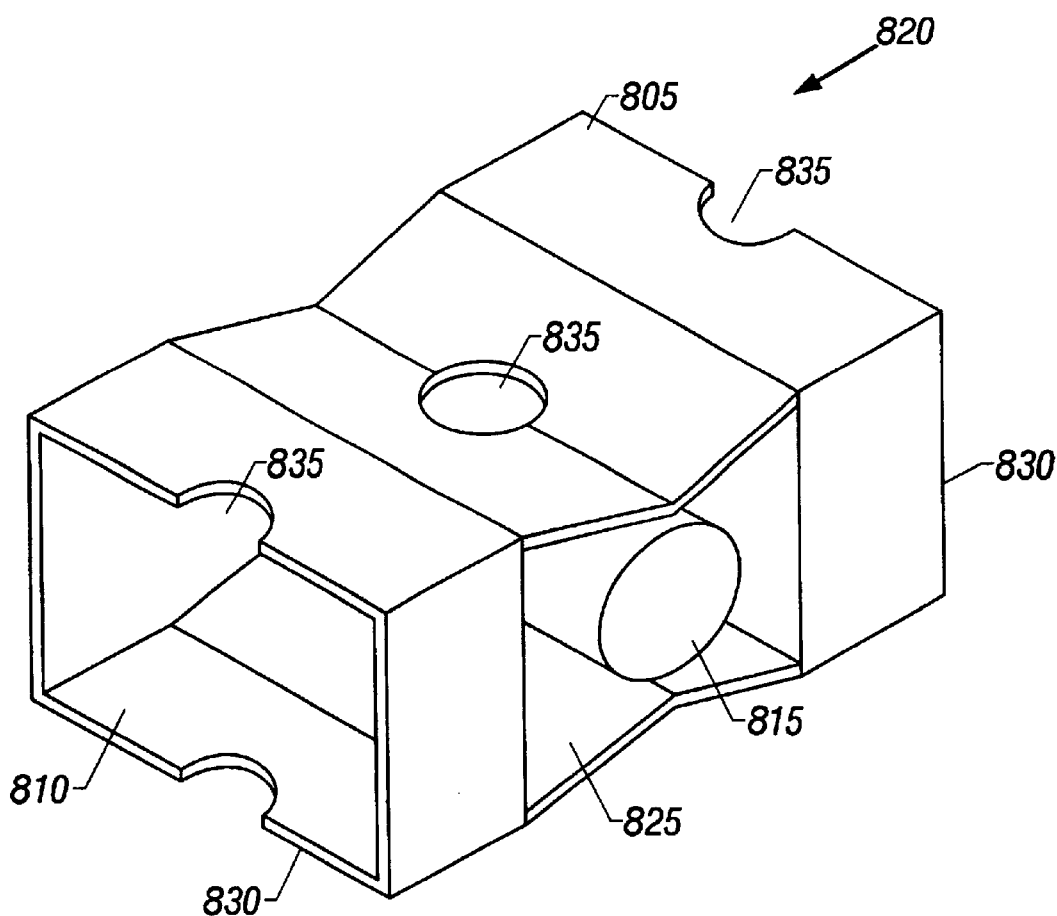

As shown in FIG. 8B, another configuration of the compact illuminator 820 includes a reflector 805 with reflective, heat-dissipating surfaces 810. The reflective surfaces 825 nearest the light source 815 are angled to more efficiently direct light to the output ports 830. However, the surfaces 825 may also be curved (e.g., parabolic or elliptical in shape) rather than planar. The reflector 805 includes vent holes 835 to reduce heat in the compact illuminator 820. The reflector 805 is easily formed from one or two pieces of stamped metal, resulting in low manufacturing costs. The reflective surfaces 825 may be formed by vapor deposition on plastic or other materials.

Figure 8C:
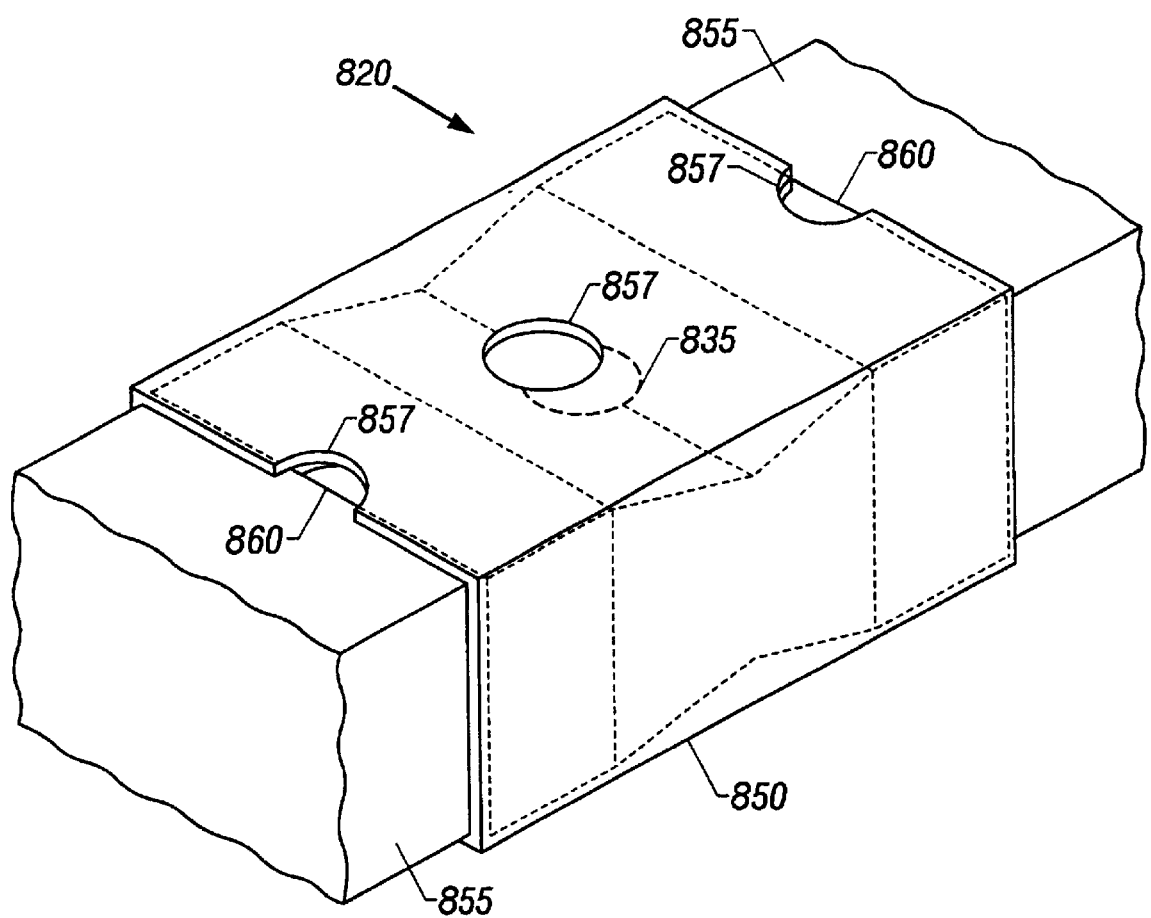

As shown in FIG. 8C, the compact illuminator 820 may have a housing 850 that surrounds the reflector 805. The housing may extend beyond the edges of the output ports 830 to provide support for optical waveguides 855 positioned at the output ports 830. The waveguides 855 may be abutted to rectangular output ports 830 and may have input faces that are the same size as the output ports 830. Alternatively, the output ports 830 and waveguides 855 may be round. In addition, fiber optic conduits may be used in place of the waveguides 855. Such a configuration provides for an efficient collection of light from the light source. The housing 850 includes vent holes 857 that are aligned with the vent holes 835 of the reflector 805.

Figure 8D:
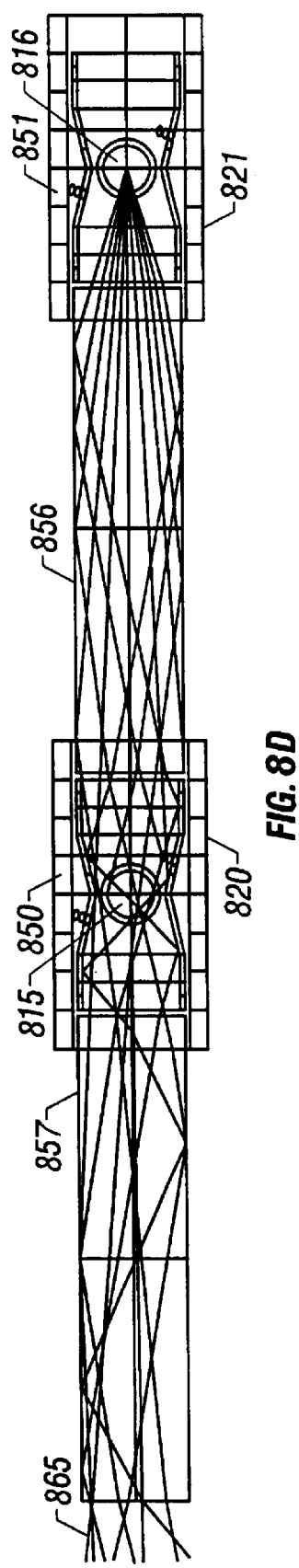

FIG. 8D shows an example of light rays 865 passing through a network of redundant compact illuminators including a first illuminator 821 and a second illuminator 820. The illuminators have housings 850 and 851 and are connected by optical waveguides, a first waveguide 856 and a second waveguide 857, although the illuminators also may be joined directly without an intervening waveguide. The light rays 865 initiate at a first light source 816 in the first illuminator 821. The light rays 865 pass through a waveguide 856 connected to the a second illuminator 820, pass through the second illuminator 820 and are output to a second waveguide 857. The second waveguide 855 may lead to a distribution network or an output device such as an interior light for a vehicle.

Such a configuration conveniently provides light source redundancy. If both light sources 815 and 816 are functioning, then within the second illuminator 820, a portion of the light from the second light source 815 combines with the light received from the first light source 816. The combined light is output to the second waveguide 857. If one of the light sources fails, the other source will continue to provide light to the output device or distribution network, though at a reduced light level.

Figure 8E:
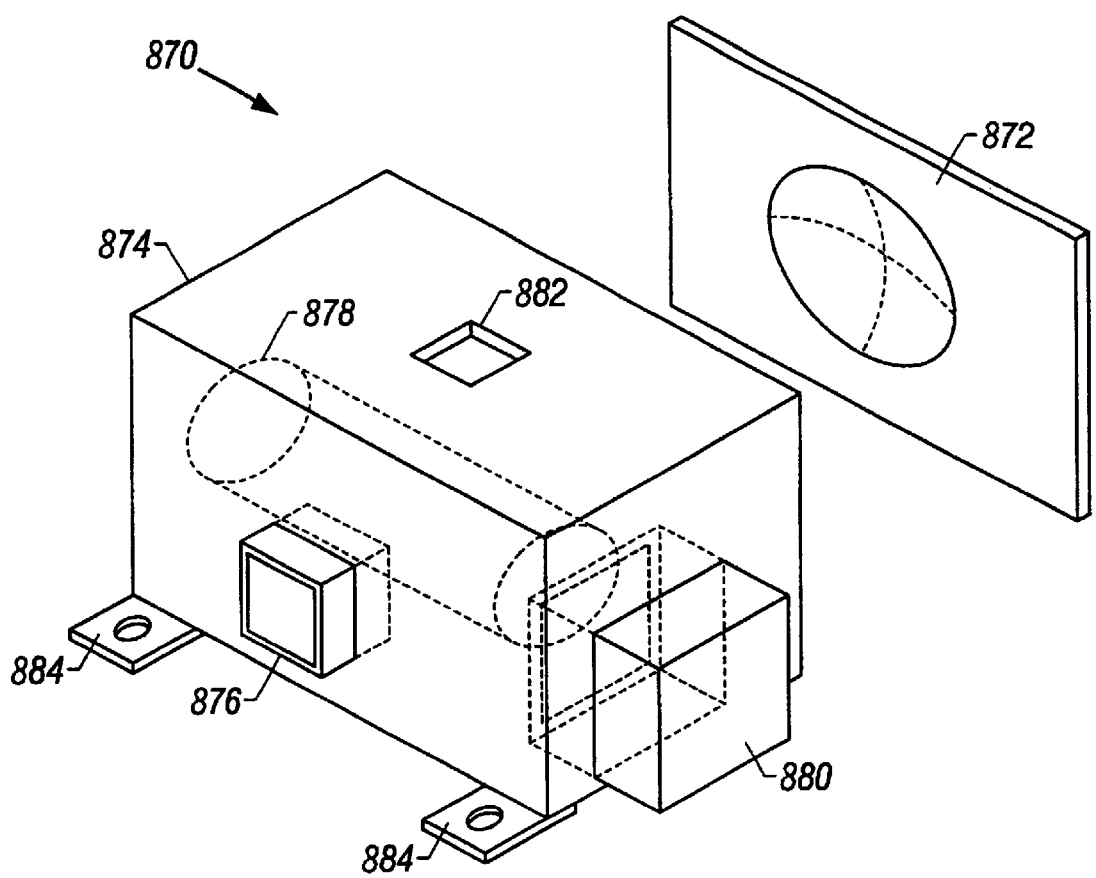

FIG. 8E shows a dual-source, hybrid compact illuminator 870 that provides a direct lighting function through a lens 872 covering one side of the housing 874 and a distributed lighting function through a waveguide output port 876. The housing 874 may be formed of metal or plastic (e.g., injected molded plastic). The hybrid compact illuminator 870 has reflective interior walls and a primary light source 878, such as a cartridge bulb. The interior walls may be curved to form a reflector to increase light collection efficiency. The waveguide output port 876 is configured so that an optical waveguide may be inserted into the port and held in position with an adhesive, such as epoxy, or by mechanical means, such as a waveguide connector. The waveguide output port 876 is positioned so that the input face of the inserted optical waveguide efficiently receives light from the primary light source. The end of the inserted waveguide may have optical collector elements or lenses formed on the input face, as described above.

The dual-source hybrid compact illuminator 870 also has a secondary light source, e.g., a cartridge bulb or a PC bulb, in a compartment 880 that protrudes from the side of the housing 874 (a single-source, hybrid compact illuminator having only a primary light source is also possible). The secondary light source may be used for lighting functions that require a lower power, longer life light source. The compartment 880 may have a waveguide output port to provide a distributed lighting function or an output lens to provide a direct lighting function.

Alternatively, the compartment 880 may be open to the interior of the housing and may extend into the housing. The compartment may be positioned so that the secondary light source provides illumination for the direct and distributed lighting functions in case of failure of the primary light source 878. Vent holes 882 and installation mounting holes 884 also are provided.

The compact illuminator has a compact size, stays cool, and reduces lamp placement error, which increases efficiency. The compact illuminator also provides a convenient building block for a redundant network to provide interior or exterior lighting functions and may easily be installed in a distributed lighting system. In addition, the hybrid compact illuminator provides both direct and distributed lighting functions.

By combining two sources in a single unit, the dual-source, hybrid compact illuminator provides light for several lighting functions and light source redundancy while lowering complexity and manufacturing costs. For example, a single circuit may be used to drive the two sources. In addition, the dual-source unit reduces the number of parts in a system, which in turn reduces cost and complexity.

Referring again to FIG. 7, waveguide collector elements 220 in the tail light subsystem are positioned close to the source 705 to receive light and transmit the light to other lighting elements, such as the rear turn signals 140, backup lights 150, and center high-mounted stop light (CHMSL) 145. A combination stop/rear turn signal light may be modulated with a LCLV 610, as discussed above with respect to the forward turn signals. The backup lights 150 and CHMSL 145, however, are modulated with opaque shutters 615, since they must be completely dark in the OFF mode.

Figure 9A:
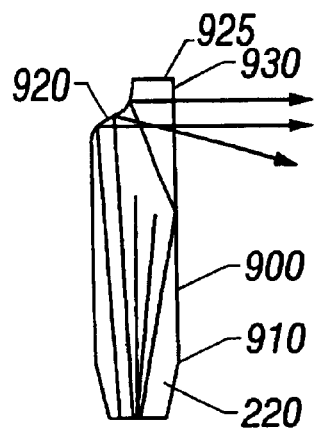
FIGS. 9A and 9B show a waveguide output bend for a tail light.
Figure 9B:
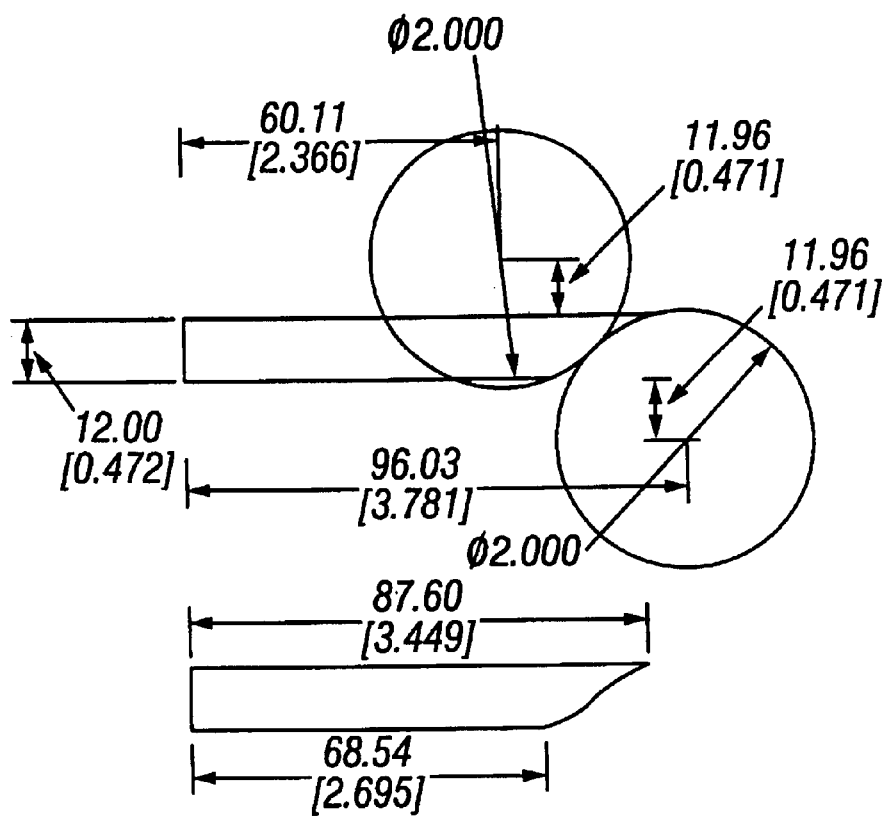

The rear turn signals subsystems 140 also may be implemented in the manner shown in FIGS. 9A and 9B. In particular, a waveguide section 900 may be used to provide a desired beam pattern for the rear turn signal. Light from a collector element 220 or an independent light source is received at the input 910 of the waveguide section 900 and is internally reflected by the surfaces of the waveguide as it propagates. The waveguide 900 includes a bend 920 immediately prior to the output 930. The outer surface of the bend 920 is s-shaped, which changes the distribution of light across the output surface 930 and hence the far field beam pattern of the turn signal. The outer surface of the bend 920 may be coated with silver or aluminum to increase reflectivity. The top surface 925 also may serve as an output port. As an example, FIG. 9B shows dimensions in mm [inches] of a waveguide 900 that might be used to provide a desired beam pattern.

Figure 10A:
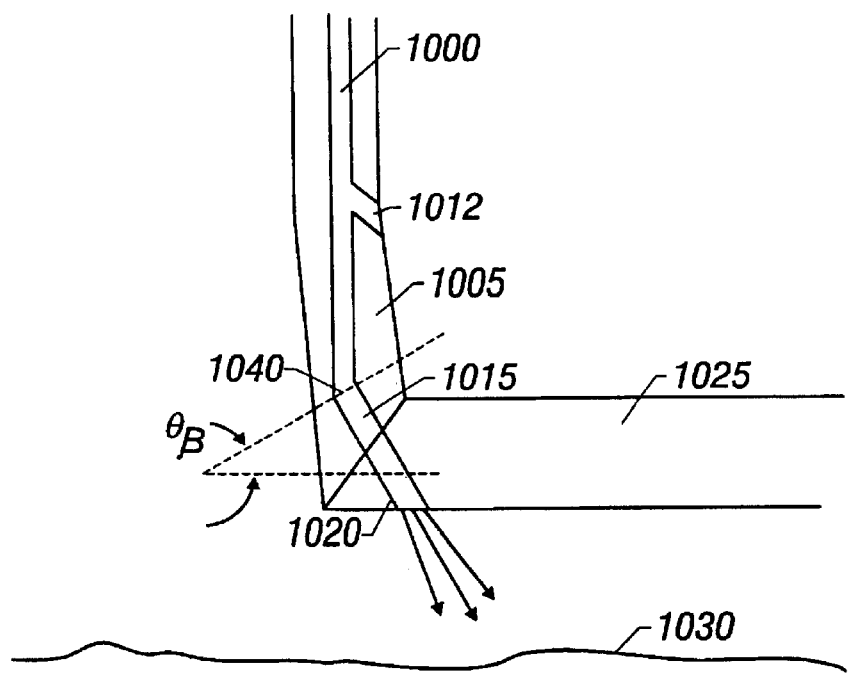
FIGS. 10A and 10B show a combination security/puddle light.
Figure 10B:
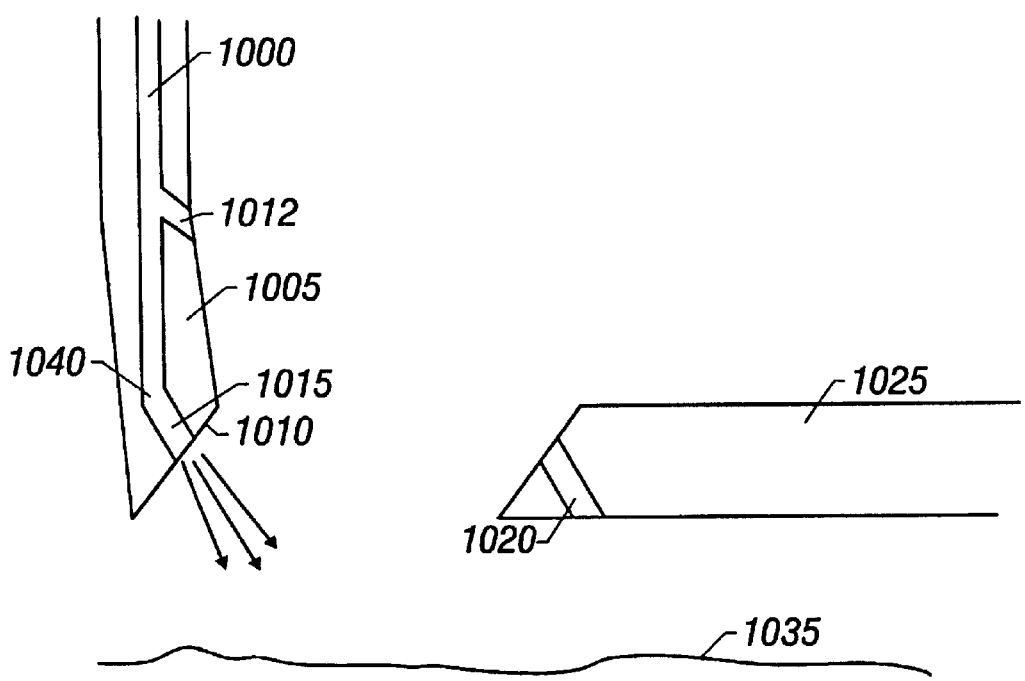

The DLS also may be used to provide other lighting functions. For example, a waveguide 1000 may be installed in the door 1005, as shown in FIGS. 10A and 10B, to provide a security/puddle light. The waveguide 1000 runs from a light source, such as the hybrid headlamp subsystem 105 (FIG. 1), to the bottom edge 1010 of the door 1005. The waveguide 1000 may have a lens formed at its output end. A waveguide branch 1012 may be used to implement a interior door light. When the door 1005 is closed, as in FIG. 10A, a door waveguide section 1015 connects to a waveguide 1020 that passes through the floor 1025. The floor waveguide section 1020 provides a security light that illuminates the area 1030 underneath the vehicle. The ends of the floor waveguide section 1020 may have integrally formed lenses. When the door 1005 is open, as in FIG. 10B, the door waveguide 1015 provides a puddle light that illuminates the ground 1035 between the open door and the vehicle. The bend 1040 in the door waveguide section 1015 may have a bend angle ($\theta_B$) of, for example, 20°. The bend 1040 helps to direct the output of the waveguide 1000 to the desired area. Alternatively, the security/puddle light may be implemented as a hybrid subsystem that has an independent light source. The independent light source may directly provide interior lighting for the vehicle in addition to being connected to the waveguide 1000 as a light source for the security/puddle light.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and assist grips.

Figure 11A:
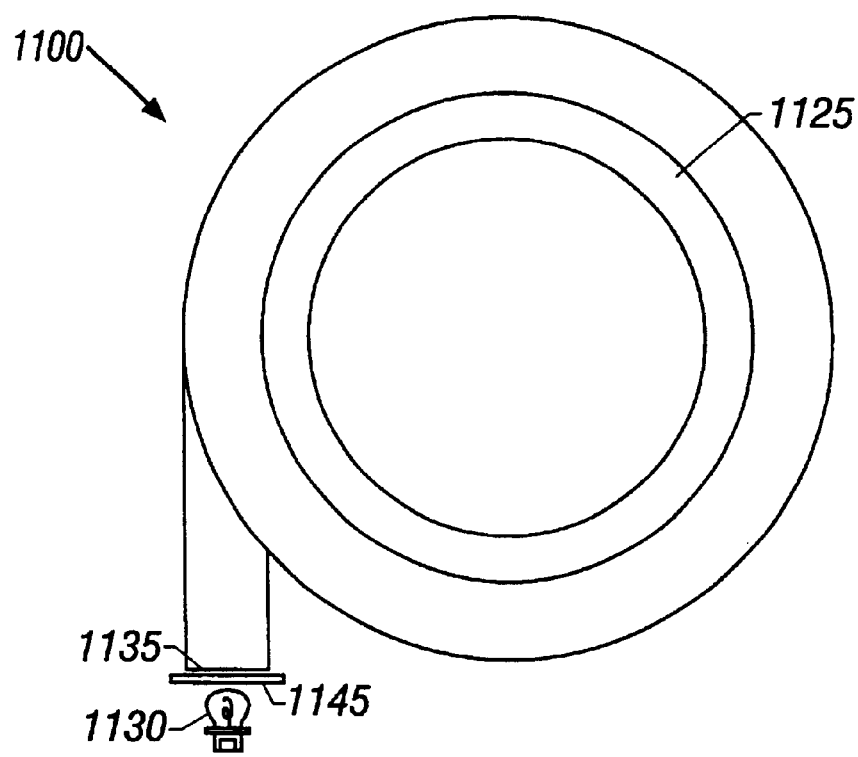
FIGS. 11A–11F show various embodiments of a cup holder illumination component.
Figure 11B:
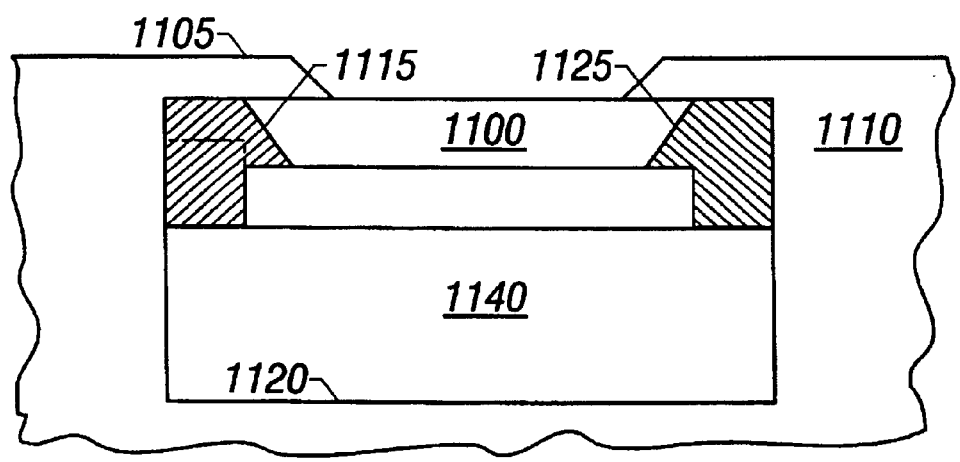

For example, as shown in FIGS. 11A and 11B, a waveguide 1100 may be installed under the lip 1105 of a cup holder 1110. Although the shape of the waveguide 1100 in FIGS. 11A and 11B is circular, any shape may be used depending upon the shape and size of the cup holder 1110. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

The waveguide 1100 may have a protruding, angled upper region 1115 to reflect and/or transmit light downward toward the bottom 1120 of the cup holder 1110. The upper surface 1125 of the angled portion 1115 may be stippled and may be covered with a layer of opaque material to prevent leakage of light in the upward direction. A small incandescent bulb 1130 at the input 1135 of the waveguide is used as a source. A colored filter 1145 may be placed between the bulb 1130 and the input 1135 to achieve a desired illumination color. When illuminated, the interior 1140 of the cup holder 1110 glows faintly so as not to interfere with the driver's vision. The glowing illumination allows the occupants of the vehicle to discern the location of the cup holder 1110. Light for the waveguide 1100 also may be provided by a waveguide 135 connected to one of the lighting subassemblies.

Figure 11C:
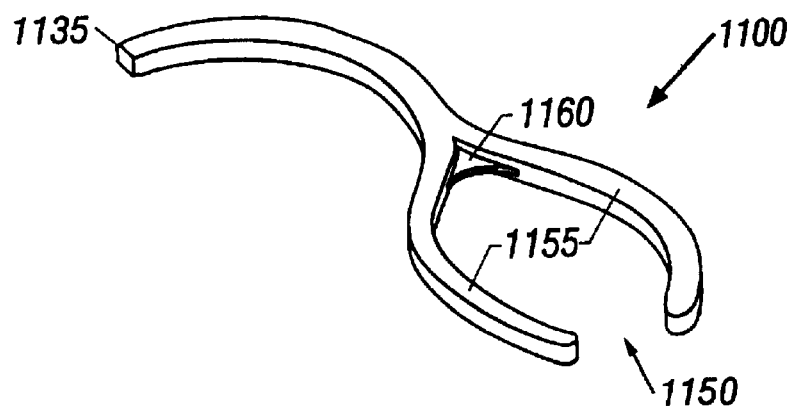
Figure 11D:
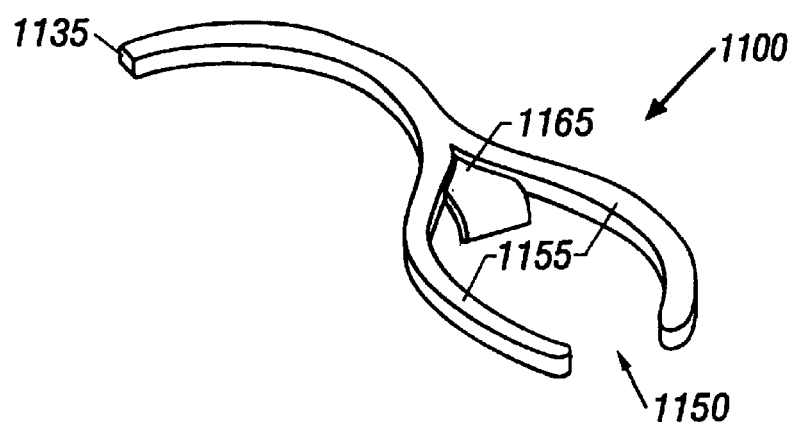

Another embodiment of the cup holder illumination waveguide 1100 is shown in FIGS. 11C–11D. These "wishbone" shaped waveguides 1100 are configured for cup holders having a gap 1150 to accommodate a mug handle. Light for the waveguide 1100 enters the input 1135 and is split essentially equally to the two arms 1155 of the wishbone. The split in the waveguide 1100 may lead to a dark area in the illumination of the cup holder. Therefore, as shown in FIG. 11C, a web portion 1160 is included between the two arms 1155. The web portion may be thinner than the rest of the waveguide 1100 and provides additional illumination to the portion of the interior 1140 of the cup holder directly beneath the split in the wishbone.

Figure 11E:
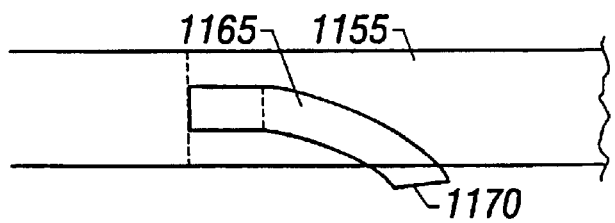

Alternatively, as shown in FIG. 11D, a tab 1165 may extend downward from the split to reflect and/or transmit light toward the bottom of the cup holder. The tab 1165 has a generally rectangular cross-section and curves downward toward the bottom 1120 of the cup holder. The tab 1165 may be thinner than the rest of the waveguide 1100. As shown in FIG. 11E, the tab 1165 also may have a chamfered leading edge 1170.

Figure 11F:
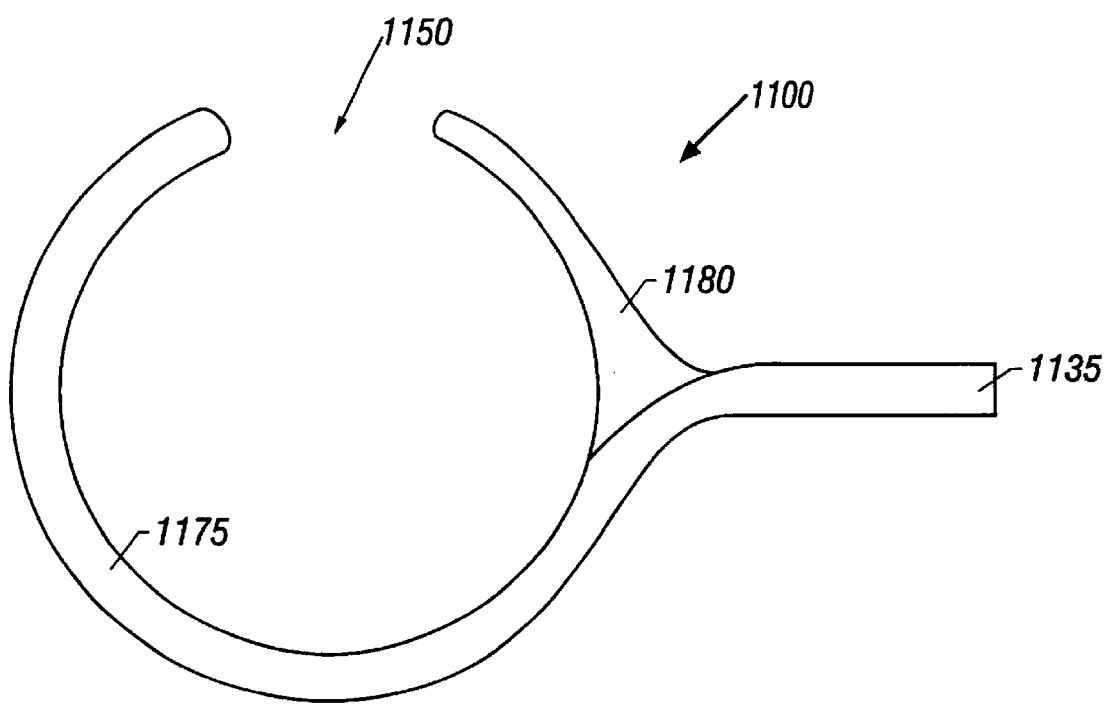

Yet another embodiment of the cup holder illumination waveguide 1100 is shown in FIG. 11F. As in the previous embodiment, the waveguide 1100 is configured for cup holders having a gap 1150 to accommodate a mug handle. Light enters the input 1135 and is split unequally between a primary arm 1175 and a secondary arm 1180. The secondary arm has a smaller cross-section, (i.e., is thinner and narrower than the primary arm 1175. Since the secondary arm 1180 is shorter than the primary arm 1175, there is less loss along its length. The smaller cross-section of the secondary arm 1180 allows less light to enter the secondary arm, which balances the light in the two arms 1175 and 1180 provides uniform illumination around the circumference of the cup holder.

Figure 12A:
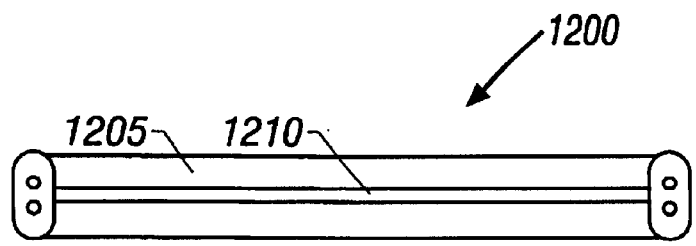
FIG. 12A is a rear view of a waveguide installed in a handgrip.
Figure 12B:
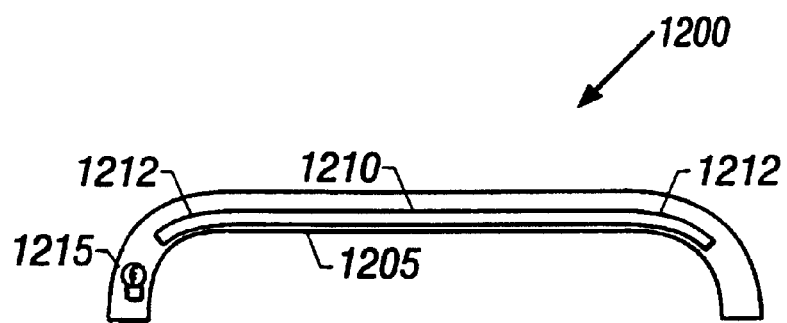
FIG. 12B is a cross-section view of a waveguide and light source installed in a handgrip.
Figure 12C:
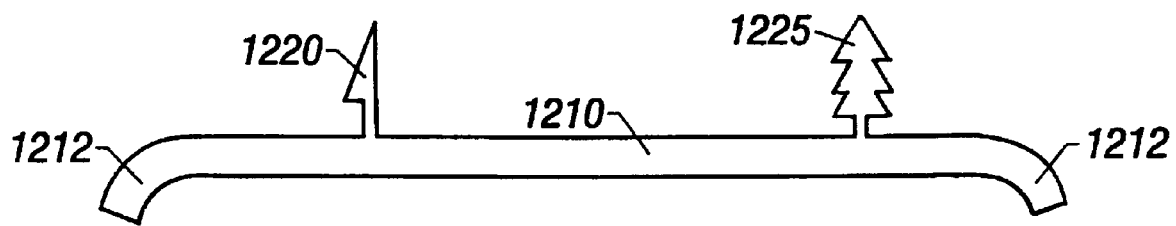
FIG. 12C shows a waveguide with integrated snaps for installation into a handgrip.

Similar structures may be used in the interior of a map pocket or, as shown in FIGS. 12A–12C, along the interior surface 1205 of a assist grip 1200. A length of waveguide 1210 is installed along the inner surface 1205. The waveguide includes bends 1212 at the ends to conform to the shape of the assist grip. A small incandescent bulb 1215 provides a light source. The bulb may be used in conjunction with a lens (not shown) to provide a courtesy light. Alternatively, the assist grip 1200 may be connected by a waveguide to another light source in the DLS. As shown in FIG. 12C, the waveguide 1210 may be formed with snaps 1220 and 1225 to make installation into the assist grip 1200 easier.

Figure 13:
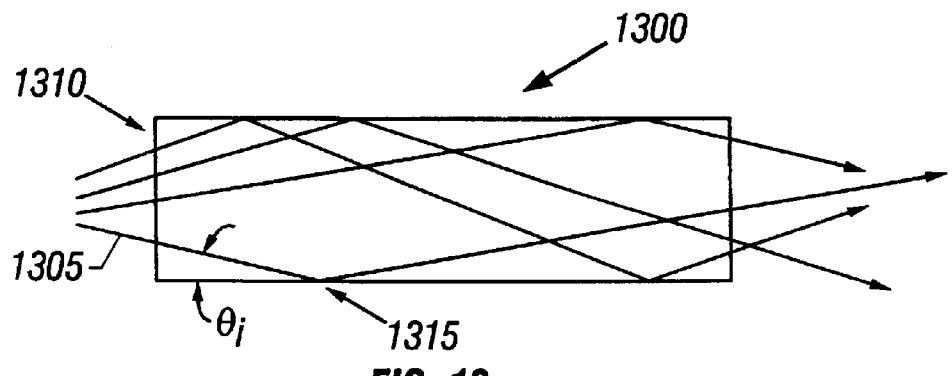
FIG. 13 is a cross-section view of an optical waveguide.

Different types of waveguide structures may be used in the DLS to transmit light from the sources to the lighting outputs. A basic waveguide, as shown in FIG. 13, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve smaller bend radii than fiber.

As shown in FIG. 13, a light ray 1305 that has entered through the input face 1310 proceeds through the waveguide 1300 until the light ray 1305 reaches an outer surface 1315 of the waveguide 1300, i.e. an interface between the material of the waveguide 1300 and air. At the outer surface 1315, light is reflected in accordance with Snell's law. If the angle of incidence ($\theta_i$) of the light ray 1305 at the outer surface 1315 is less than a threshold referred to as the critical angle ($\theta_C$), then the light ray 1305 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_C$, would be:

$$\theta_C = \arcsin(n_a/n_b) = \arcsin(1/1.5) = 41.8$$

where $n_a$ is the index of refraction of air (1.0) and $n_b$ is the index of refraction of acrylic (1.5).

Figure 14A:
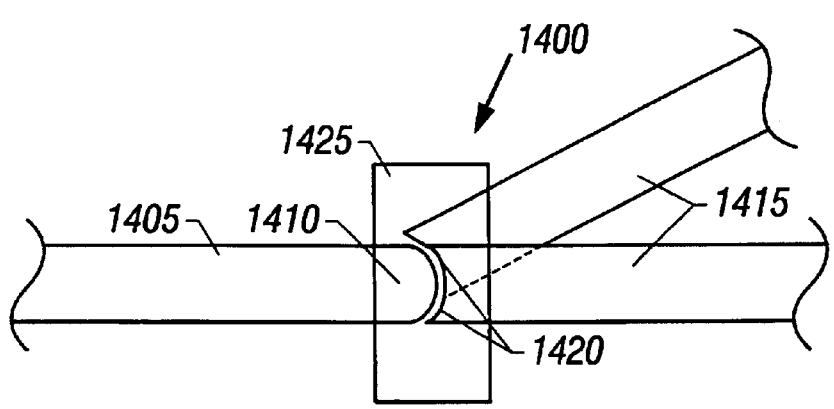
FIGS. 14A and 14B are side and bottom views of a waveguide joint.
Figure 14B:
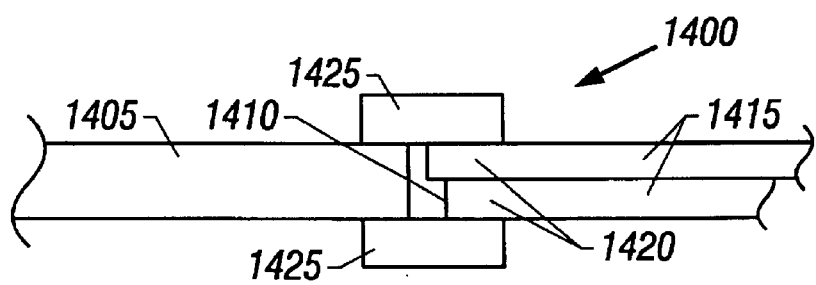

Referring to FIGS. 14A and 14B, a waveguide joint 1400 may be used to distribute light in the DLS. For example, the joint may be used to provide light to a door of the vehicle. The waveguide joint 1400 has a trunk section 1405 with a convex curved end 1410. Branch sections 1415 having convex curved ends 1420 adjoin the trunk section 1405. The branch sections may be held in place by a plastic band 1425 surrounding the joint region or by epoxy or snaps. Light input to the trunk section 1405 is essentially split among the branch sections 1415. The branch sections 1415 may be positioned to carry light to different sections of the vehicle. With this configuration, it is possible to reconfigure the branch sections 1415 in the event of design changes. Epoxy that has an index of refraction approximately equal to that of the waveguide, i.e., that is index-matched, may be used to hold the branch sections 1415 in place. The joint 1400 may have only a single branch section 1415 that is used to change the direction of the trunk section 1405 or to provide a hinged connection. A hinged connection using the joint 1400 may be installed, for example, in a car door. Index-matched fluid may be used to lubricate and reduce discontinuity at the interface between the trunk 1405 and the branch 1415, which will reduce the loss through the joint 1400.

Figure 15:
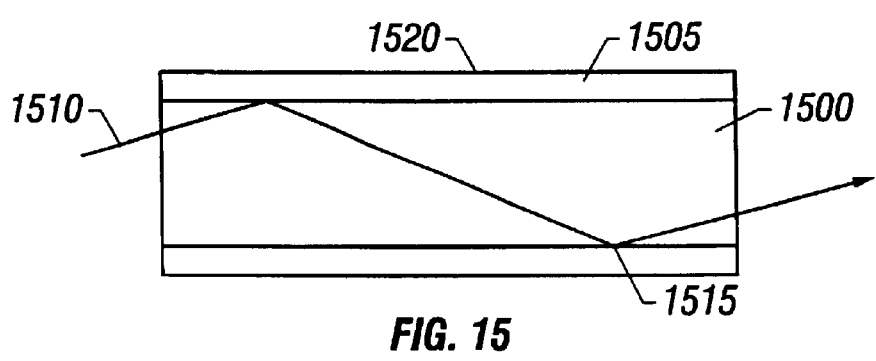
FIG. 15 is a cross-section view of an epoxy-coated optical waveguide.

FIG. 15 shows a waveguide core 1500 surrounded by an epoxy coating 1505. The epoxy coating 1505 may be applied by dipping the waveguide core 1500 (which may be formed, for example, from acrylic) in a reservoir of epoxy and allowing the coating to dry or by spraying. The epoxy coating 1505 has a lower index of refraction than the waveguide core 1500. The distribution of light in the waveguide peaks at the center of the waveguide and diminishes toward the edges of the waveguide. Overall, a significant portion of the light is confined within the waveguide core 1500.

The epoxy coating 1505 offers several advantages compared to an uncoated waveguide. For example, contaminants on the surface of an uncoated waveguide can cause light 1510 at the waveguide/air interface to be scattered and transmitted outside of the waveguide instead of being internally reflected, which increases loss in the uncoated waveguide. The epoxy coating 1505 increases the distance between the contaminants and the waveguide core 1500, which reduces the amount of light that reaches the waveguide/air interface 1520 of the coated waveguide. In addition, plastic coatings can be applied to the outside surfaces of the epoxy layer, and clamps and other fixtures can be attached to the outside surfaces with reduced effect on light transmission through the waveguide core 1500. One also could use a waveguide formed from polycarbonate (which has an index of refraction of 1.58) with an outer coating of epoxy (which has an index of refraction of 1.4). Alternatively, one could use a waveguide having a glass core and an outer coating having a lower index of refraction.

Figure 16A:
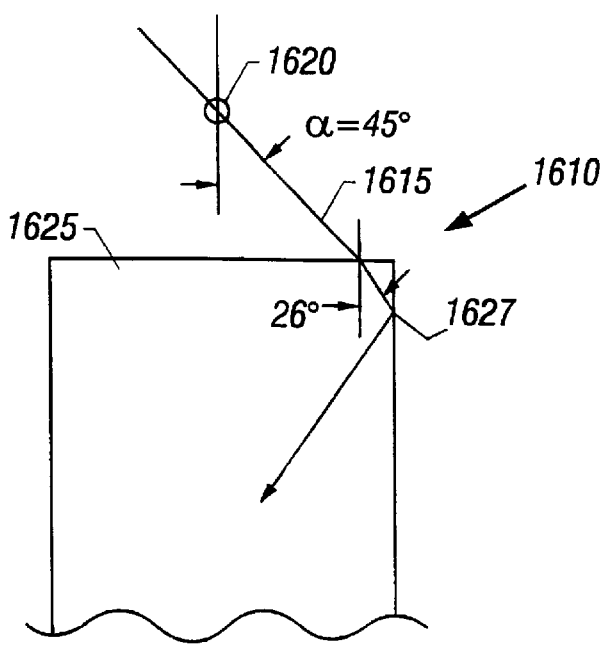
FIGS. 16A–16C are cross-section views of non-tapered and tapered waveguide inputs.
Figure 16B:
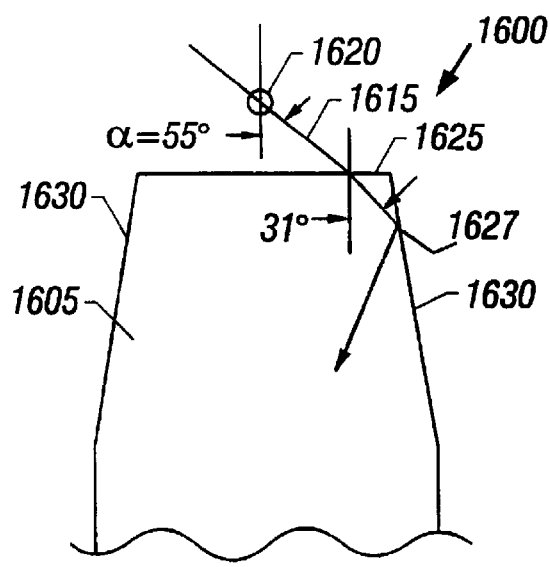
Figure 16C:
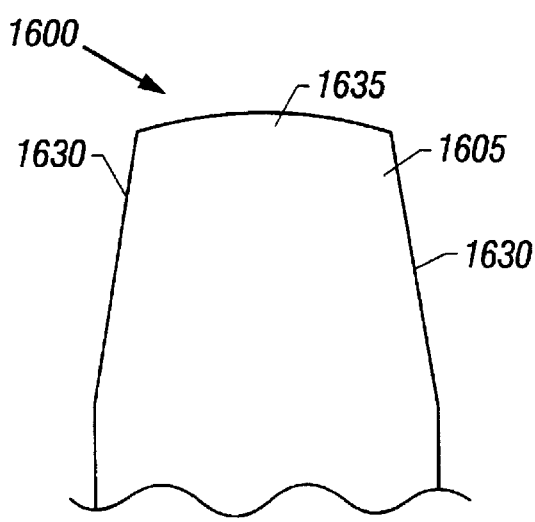

As shown in FIGS. 16A–C, a waveguide 1600 may have a pinched end that acts as a collector element 1605. The collector element 1605 increases the acceptance angle (α) of the waveguide 1600 and thereby increases light collection efficiency. The end of the waveguide 1600 may be pinched in two dimensions to form an essentially trapezoidally shaped collector element 1605. The collector element 1605 may be formed on the end of a waveguide 1600 having a cross-section that is rectangular, round, or of some other shape.

For example, FIG. 16A shows a waveguide 1610 without a pinched end. Light 1615 from a light source 1620 enters the waveguide 1610 at an angle of 45°. At the input face 1625, the light is bent in accordance with Snell's Law to form an angle of 26° with respect to a direction perpendicular to the input face 1625. The light reaches the outer edge 1627 of the waveguide at an angle of 26° and is confined within the waveguide by internal reflection.

FIG. 16B shows a waveguide 1600 with a pinched end. Light enters the input face at an angle of 55°. Hence, the acceptance angle of the pinched waveguide 1600 can be made greater than the acceptance angle of the waveguide 1610 without the pinched end. At the input face 1625, the light is bent to form an angle of 31° with respect to a direction perpendicular to the input face 1625. The light reaches the outer edge 1627 of the waveguide at an angle of 26° (since the inclined walls 1630 of the pinched portion are angled inward by 5°) and is confined within the waveguide by internal reflection.

As shown in FIG. 16C, the pinched end of the waveguide 1600 may be formed so that an excess of material at the tip of the waveguide 1600 bulges outward to form a lens 1635 with a desired focal length. The lens 1635 focuses received light, further increasing the acceptance angle of the waveguide 1600.

Other embodiments are within the scope of the following claims.

What is claimed is:

1. A compact illuminator comprising:
   a housing having open ends, each configured to receive a waveguide that is complementary in shape with its associated open end,
   a reflector positioned within the housing, the reflector having:
      open end portions,
      a central portion between the end portions,
      a light source positioned within the central portion, and
      side walls extending between the end portions and at least partially enclosing the central portion, the side walls protruding inward toward the light source,
   wherein the reflector is shorter in length than the housing such that each end portion has an axial edge that is located inwardly of its corresponding open end of the housing so that each waveguide fits within an open end of the housing and can axially abut the edge of one of the end portions in contact with that edge, whereby axial movement of the waveguide into the housing is limited by contact with the edge of the reflector.

2. The compact illuminator of claim 1, wherein a length of the end portions serves to confine light output by the illuminator within the waveguides by internal reflection.

3. The compact illuminator of claim 1, wherein the side walls comprise planar surfaces and an angle formed by the side walls serves to confine light output by the illuminator within the waveguides by internal reflection.

4. The compact illuminator of claim 1, further comprising vent holes in the side walls.

5. The compact illuminator of claim 1, further comprising vent holes in the housing.

6. The compact illuminator of claim 1, wherein the reflector comprises a separate component that is inserted into a central region of the housing.

7. A compact illuminator comprising:
   a housing having open ends configured to receive waveguides,
   a first reflector positioned within the housing, the reflector having:
      open end portions,
      a central portion between the end portions,
      a first light source positioned within the central portion, and
      side walls extending between the end portions and at least partially enclosing the central portion, the side walls protruding inward toward the light source,
   wherein the reflector is shorter in length than the housing so that the waveguides fit within the housing and abut the end portions of the reflector,
   a second reflector having:
      open end portions,
      a central portion between the end portions,
      a second light source positioned within the central portion, and
      side walls extending between the end portions and at least partially enclosing the central portion, the side walls protruding inward toward the light source; and
   an optical waveguide positioned between an output of the first reflector and an input of the second reflector.

8. A redundant distributed lighting system having first and second illuminators, each illuminator having a reflector comprising:
   open end portions,
   a central portion between the end portions,
   a light source positioned within the central portion, and
   side walls extending between the end portions and at least partially enclosing the central portion, the side walls protruding inward toward the light source,
      wherein the lighting system further comprises an optical waveguide positioned between an output of the first illuminator and an input of the second illuminator.

9. The redundant distributed lighting system of claim 8, wherein a length of the end portions serves to confine light output by the illuminators within the waveguide by internal reflection.

10. The redundant distributed lighting system of claim 8, wherein the side walls comprise planar surfaces and an angle formed by the side walls serves to confine light output by the illuminators within the waveguide by internal reflection.

11. The redundant distributed lighting system of claim 8, further comprising vent holes in the side walls of the reflectors.

12. The redundant distributed lighting system of claim 8, wherein each illuminator further comprises a housing having open ends configured to receive waveguides, the housings being longer in length than the reflectors so that the waveguides fit within the housing and abut the end portions of the reflectors.

13. The redundant distributed lighting system of claim 12, further comprising vent holes in the housing.

14. A redundant distributed lighting system having first and second illuminators, each illuminator having a reflector comprising:
   open end portions,
   a central portion between the end portions, a light source positioned within the central portion, and side walls extending between the end portions and at least partially enclosing the central portion, the side walls protruding inward toward the light source, wherein one of the open end portions of the first illuminator abuts one of the open end portions of the second illuminator.

15. A hybrid compact illuminator comprising:

a housing having one or more reflective interior surfaces, a lens mounted at a first opening in the housing, a primary light source configured to emit light from a first location within the housing such that a first portion of the light originating from the primary light source at the first location provides direct illumination through the lens, an output port located at a second opening in the housing and configured to receive an optical waveguide, wherein the output port is positioned such that the waveguide receives a second portion of the light originating from the primary light source, and a secondary light source positioned within a compartment supported by the housing, wherein the secondary light source is configured to emit light from a second location that is offset from the first location and wherein the compartment is open into the interior of the housing such that light originating from the secondary light source at the second location can exit the housing through at least one of its first and second openings.

16. The hybrid compact illuminator of claim 15, wherein the one or more reflective interior surfaces comprise a reflector located within the housing.

17. The hybrid compact illuminator of claim 15, wherein the compartment protrudes from the housing.

18. The hybrid compact illuminator of claim 15, wherein the compartment extends into the housing.

19. The hybrid compact illuminator of claim 15, wherein the housing includes one or more vent holes.

* * * * *

UNITED STATES PATENT AND TRADEMARK OFFICE
CERTIFICATE OF CORRECTION

PATENT NO. : 6,260,991 B1
DATED : July 17, 2001
INVENTOR(S) : George R. Hulse

It is certified that error appears in the above-identified patent and that said Letters Patent is hereby corrected as shown below:

Column 1,
Line 8, delete "a con't of".

Signed and Sealed this

Twenty-sixth Day of February, 2002

Attest:

JAMES E. ROGAN
Attesting Officer   Director of the United States Patent and Trademark Office